(12) United States Patent
Melkote et al.

(10) Patent No.: US 6,963,465 B1
(45) Date of Patent: Nov. 8, 2005

(54) METHOD FOR PREVENTING RADIAL ERROR PROPAGATION DURING SELF-SERVOWRITING OF TRACKS IN A MAGNETIC DISK DRIVE

(75) Inventors: Hemant Melkote, San Jose, CA (US); Robert J. McNab, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/882,971

(22) Filed: Jun. 29, 2004

(51) Int. Cl.[7] .............................................. G11B 21/02
(52) U.S. Cl. ....................................................... 360/75
(58) Field of Search ......................................... 360/75

(56) References Cited

U.S. PATENT DOCUMENTS

| | | |
|---|---|---|
| 5,541,784 A | 7/1996 | Cribbs et al. |
| 5,659,426 A | 8/1997 | Aoki |
| 6,608,731 B2 | 8/2003 | Szita |
| 2002/0036859 A1 * | 3/2002 | Liu et al. ..................... 360/75 |

OTHER PUBLICATIONS

H. Melkote et. al, "A study of radial error propagation and self servowriting in disk drives", in Proceedings of the American Control Conference, Denver, CO, Jul. 2002.

D. Arzelier, D. Peaucelle, "An iterative method for mixed H2/Hinfinity synthesis via static output-feedback", CDC, Las Vegas, 2002.

* cited by examiner

Primary Examiner—David Hudspeth
Assistant Examiner—Mitchell Slavitt
(74) Attorney, Agent, or Firm—Robroy R. Fawcett, Esq.

(57) ABSTRACT

The present invention may be embodied in a method for preventing radial error propagation during self-servowriting of concentric tracks on a magnetic disk in a disk drive. Each written track comprises a plurality of embedded servo sectors that define a circumferential path and that eventually form corresponding servo wedges extending radially across the magnetic disk such that each servo sector t of a track corresponds to a particular servo wedge. In the method comprising, track following is performed along a previously written track and a position error signal is determined for each servo sector. A correction value is recursively estimated for each servo sector of an adjacent track. The correction value is for use in correcting a position error signal determined using the corresponding servo sector of the adjacent track to prevent radial error propagation from previously written track to the adjacent track.

5 Claims, 10 Drawing Sheets

METHOD FOR PREVENTING RADIAL ERROR PROPAGATION DURING SELF-SERVOWRITING OF TRACKS IN A MAGNETIC DISK DRIVE

BACKGROUND OF THE INVENTION

1. Field of the Invention

The present invention relates to magnetic disk drives, and more particularly, to a method for preventing radial error propagation during self-servowriting of tracks on a magnetic disk of a disk drive.

2. Description of the Prior Art and Related Information

The writing of servotrack information on a magnetic disk medium is a critical process in the manufacture of a disk drive. Conventionally, servotrack information is written with a specialized servowriting instrument mounted on a large granite block to minimize external vibration effects. Increasing track densities and decreasing disk-drive size has led to the investigation of self servowriting techniques. One issue confronting the use of self servowriting is track-to-track or radial error propagation and amplification of written-in errors and imperfections with respect to a perfectly circular track.

U.S. Pat. No. 5,907,447 to Yarmchuk et al. describes reduction of radial error propagation by generating a correction signal using a filter applied to a position error signal (PES) to reduce a closed-loop response of a track-following servo loop to less than unity at frequencies equal to integer multiples of the disk rotation frequency. While permitting implementation of self-servowriting with reduced radial error propagation, the PES filtering technique of the Yarmchuk patent fails to readily support increasingly aggressive track densities.

Accordingly, there exists a need for a technique for preventing radial error propagation during self-servo writing of tracks on a magnetic disk in a disk drive without unnecessarily increasing manufacturing costs or significantly impacting manufacturing throughput. The present invention satisfies these needs.

SUMMARY OF THE INVENTION

The present invention may be embodied in a method for preventing radial error propagation during self-servowriting of concentric tracks on a magnetic disk in a disk drive. Each written track comprises a plurality of embedded servo sectors that define a circumferential path and that eventually form corresponding servo wedges extending radially across the magnetic disk such that each servo sector t of a track corresponds to a particular servo wedge. In the method comprising, track following is performed along a previously written track k and a position error signal e is determined for each servo sector t. A correction value u is recursively estimated for each servo sector t of an adjacent track k+1 based on the equation:

$$u_{k+1}(t) = \alpha_0 e_k(t) + \alpha_1 e_k(t+1) + \alpha_2 e_k(t+2) + \alpha_3 e_k(t+3) \quad (1)$$

where k is the track number, t is the sector number for sectors corresponding to a particular wedge, and $\alpha_0, \alpha_1, \alpha_2,$ and $\alpha_3$ are learning gain coefficients. The correction value $u_{k+1}(t)$ is for use in correcting a position error signal $e_{k+1}(t)$ determined using the corresponding servo sector t of the adjacent track k+1 to prevent radial error propagation from track k to track k+1.

In more detailed features of the invention, the learning gain coefficients may be set such that $\alpha_0$ is equal to about 0.65, $\alpha_1$ is equal to about 0.25, $\alpha_2$ is equal to about 0.25, and $\alpha_3$ is equal to about 0.25.

Alternatively, the present invention may be embodied in a method for preventing radial error propagation during self-servowriting that uses a stabilizing square matrix of learning coefficients. In this method, track following is performed along a previously written track k and a position error signal e is determined for each servo sector t. A correction value u is recursively estimated for each servo sector t of an adjacent track k+1 based on the equation:

$$u_{k+1} = K e_k \quad (2)$$

where $u_{k+1}$ is a vector of dimension N, N is the total number of servo sectors per track, k is the track number, and K is a stabilizing square matrix of learning coefficients having dimensions N×N. The correction value $U_{k+1}$ is for use in correcting a position error signal $e_{k+1}$ determined using the corresponding servo sector t of the adjacent track k+1 to prevent radial error propagation from track k to track k+1.

In more detailed features of the invention, the stabilizing square matrix K may be defined as follows:

$$K = \begin{bmatrix} \alpha_0 & \alpha_1 & \alpha_2 & \alpha_3 & 0 & L & 0 \\ 0 & \alpha_0 & \alpha_1 & \alpha_2 & \alpha_3 & O & M \\ 0 & 0 & \alpha_0 & \alpha_1 & \alpha_2 & O & 0 \\ 0 & 0 & 0 & \alpha_0 & \alpha_1 & O & \alpha_3 \\ M & O & O & O & O & O & \alpha_2 \\ 0 & 0 & 0 & 0 & 0 & O & \alpha_1 \\ \alpha_1 & \alpha_2 & \alpha_3 & 0 & L & 0 & \alpha_0 \end{bmatrix} \quad (3)$$

As before, $\alpha_0$ may be equal to about 0.65, $\alpha_1$ may be equal to about 0.25, $\alpha_2$ may be equal to about 0.25, and $\alpha_3$ may be equal to about 0.25.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
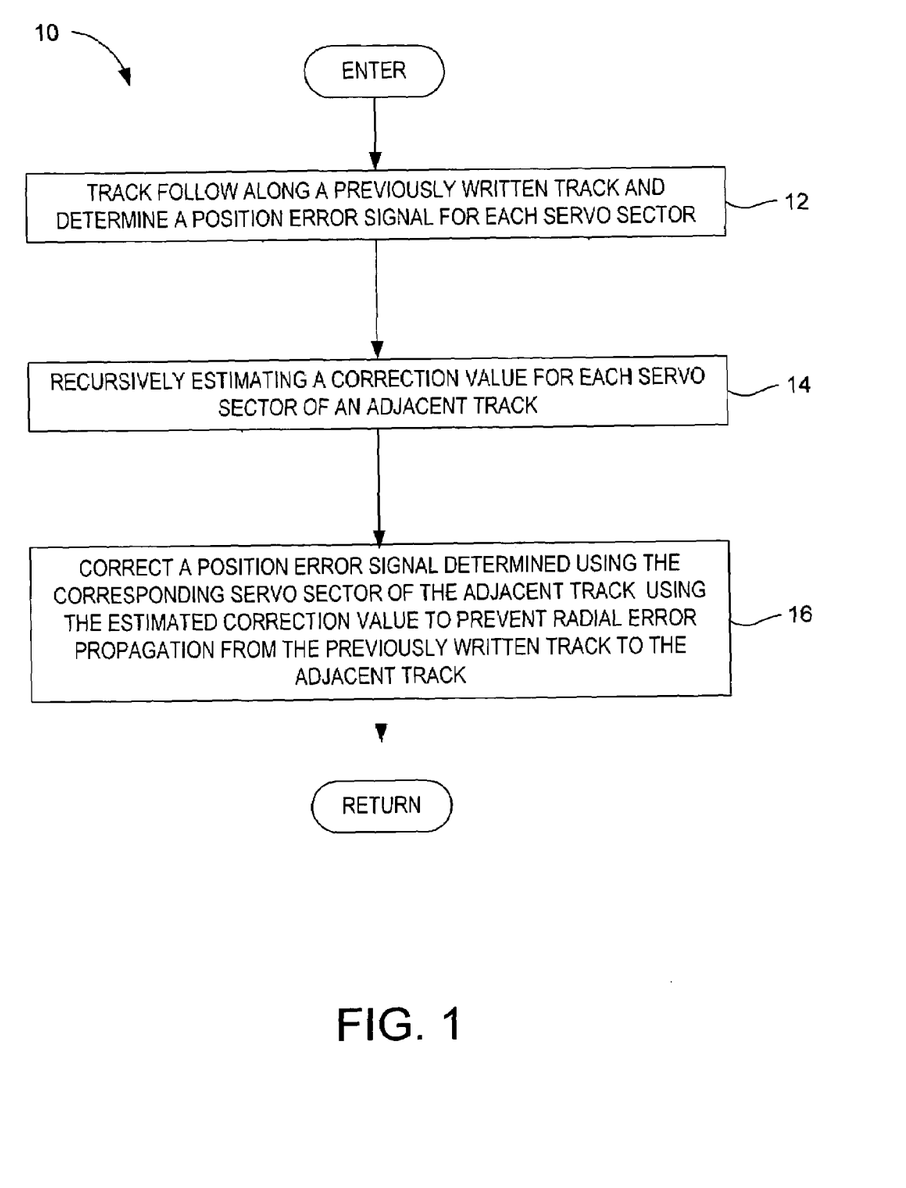
FIG. 1 is a flow chart illustrating a method for preventing radial error propagation during self-servowriting of tracks on a magnetic disk in a disk drive, according to the present invention.
Figure 2:
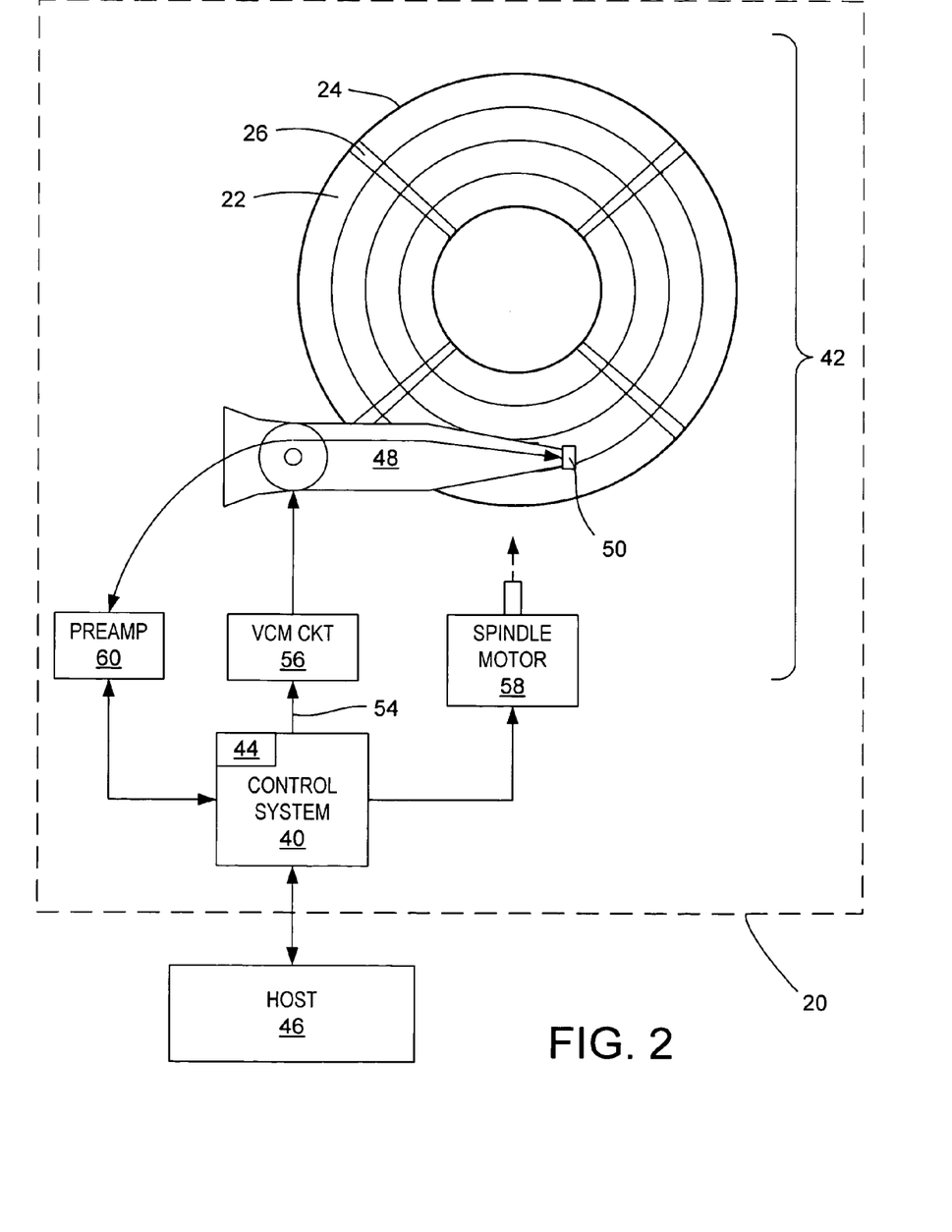
FIG. 2 is a block diagram of a computer system having a disk drive for implementing the method of FIG. 1 for preventing radial error propagation.

With reference to FIGS. 1–4, the present invention may be embodied in a method 10 (FIG. 1), implemented in a disk drive 20 (FIG. 2), for preventing radial error propagation during self-servowriting of concentric tracks 22 on a magnetic disk 24 in the disk drive 20. Each written track comprises a plurality of embedded servo sectors 26 that define a circumferential path and that eventually form corresponding servo wedges extending radially across the magnetic disk such that each servo sector t of a track corresponds to a particular servo wedge. In the method, track following is performed along a previously written track k and a position error signal e is determined for each servo sector t (step 12). A correction value u recursively estimated for each servo sector t of an adjacent track k+1 based on the equation:

$$u_{k+1}(t) = \alpha_0 e_k(t) + \alpha_1 e_k(t+1) + \alpha_2 e_k(t+2) + \alpha_3 e_k(t+3) \quad (4)$$

where k is the track number, t is the sector number for sectors corresponding to a particular wedge, and $\alpha_0$, $\alpha_1$, $\alpha_2$, and $\alpha_3$ are learning gain coefficients (step 14). The correction value $u_{k+1}(t)$ is for use in correcting a position error signal $e_{k+1}(t)$ determined using the corresponding servo sector t of the adjacent track k+1 to prevent radial error propagation from track k to track k+1 (step 12).

The disk drive 20 (FIG. 2) includes a control system 40 and a head disk assembly (HDA) 42. The control system includes a sampled servo controller 44, and circuitry and processors that control the HDA and that provide an intelligent interface between a host 46 and the HDA for execution of read and write commands. The control system may have an internal microprocessor and nonvolatile memory for implementing the techniques of the invention. Program code for implementing the techniques of the invention may be stored in the nonvolatile memory and transferred to volatile random access memory (RAM) for execution by the microprocessor. The HDA includes the rotating disk 24 having distributed position information in a plurality of uniformly spaced-apart servo wedges having the embedded servo sectors 26, and includes an actuator 48 for positioning a transducer head 50 in response to a control effort signal 54 applied to a voice coil motor (VCM) circuit 56 that includes a voice coil motor coupled to the actuator. The transducer head periodically reads the position information from the servo wedges. The sampled servo controller periodically adjusts the control effort signal during a track following operation based on the position information. The HDA further includes a spindle motor 58 and a preamplifier 60.

Figure 3:
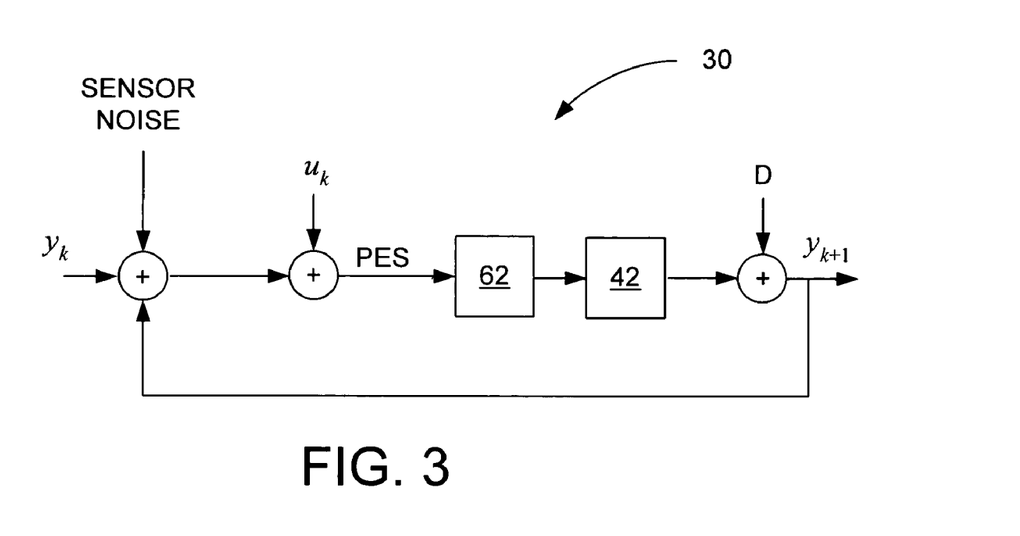
FIG. 3 is a block diagram of a servo control loop related to self-servowriting of tracks in the disk drive of FIG. 2.

A block diagram of a servo control loop 30 for implementing the method of FIG. 1 is shown in FIG. 3. The servo control loop includes the HDA 42 after a track following compensator 62. The self servowriting proceeds by track following on a previously written track k (denoted by $y_k$) and writing the servo information for the next track $y_{k+1}$. Thus, the index k here denotes the track number. During track following, disturbances D to the HDA alter the resulting head position. Sensor noise also affects the accuracy of a position signal measurement. A correction signal, denoted by $u_k(t)$, is added to a position error signal (PES) while the next track (i.e., $y_{k+1}$) is written. This correction signal is derived from the PES measured while the track $y_k$ was written. While writing servo information for track $y_{k+1}$, the PES is recorded which is to be used for determining the correction information for the subsequent track $y_{k+2}$. The process is continued until all tracks have been written.

Figure 4:
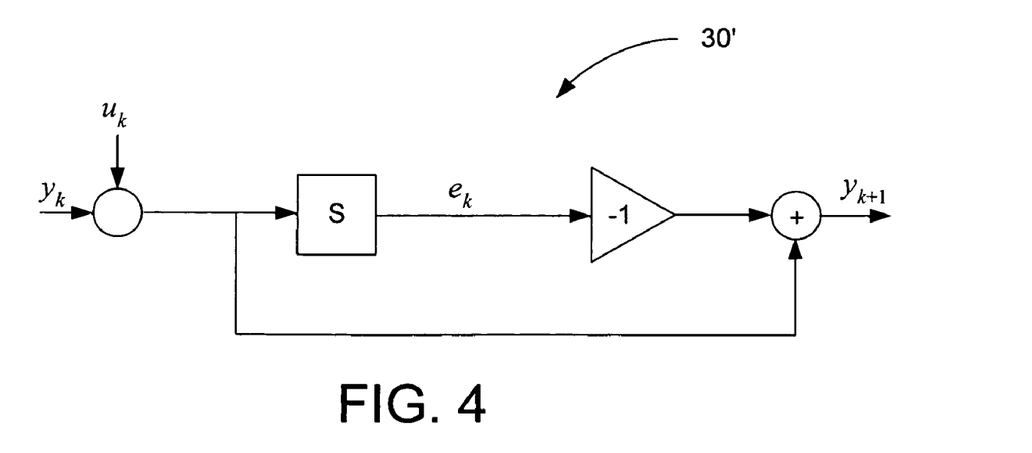
FIG. 4 is a block diagram of a servo control loop equivalent to the servo control loop of FIG. 3.

The block diagram in FIG. 3 may be simplified as shown by an equivalent servo control loop 30' in FIG. 4. For clarity all sources of track misregistration (TMR) have been removed as they do not affect the stability analysis. The transfer function from $y_k$ and $u_k$ to the next written track $y_{k+1}$ is the closed loop transfer function (1−S), while the transfer function to the PES $e_k$ is the sensitivity function S, as shown in the figure. Let the state space model for the sensitivity function S be given by $$x_k(t+1) = Ax_k(t) + B\{u_k(t) + y_k(t)\}$$

$$e_k(t) = Cx_k(t) + D\{u_k(t) + y_k(t)\} \quad (5)$$

Assume that the subsequent track (k+1) is written on the first disk revolution of track following on track k. Following the an iterative learning control (ILC) methodology, this system may be represented over one rev as follows:

define $$y_k = \begin{bmatrix} y_k(0) \\ y_k(1) \\ M \\ y_k(N-1) \end{bmatrix}; e_k = \begin{bmatrix} e_k(0) \\ e_k(1) \\ M \\ e_k(N-1) \end{bmatrix}; u_k = \begin{bmatrix} u_k(0) \\ u_k(1) \\ M \\ u_k(N-1) \end{bmatrix} \quad (6)$$

with N being the number of servo sectors. The result is:

$$e_k = H_s(y_k + u_k) + \Gamma_s x_k(0) \quad (7)$$

where $$H_s = \begin{bmatrix} D & 0 & L & 0 \\ CB & D & O & M \\ M & O & O & 0 \\ CA^{N-2}B & L & CB & D \end{bmatrix}; \Gamma_s = \begin{bmatrix} C \\ CA \\ M \\ CA^{N-1} \end{bmatrix} \quad (8)$$

From FIG. 4

$$y_{k+1} = -e_k + y_k + u_k \quad (9)$$

Substituting Equation 7 in Equation 9 provides:

$$y_{k+1} = (1-H_s)y_k + (1-H_s)u_k - \Gamma_s x_k(0) \quad (10)$$

Let the correction signal be chosen as $$u_k = Ke_{k-1} \quad (11)$$

or equivalently, $$u_{k+1} = Ke_k \quad (12)$$

where $u_{k+1}$ is a vector of dimension N, and N is the total number of servo sectors per track. Substituting for $e_k$:

$$u_{k+1} = K\{H_s(y_k + u_k) + \Gamma_s x_k(0)\} \quad (13)$$
$$= KH_s y_k + KH_s u_k + K\Gamma_s x_k(0)$$

By combining Equations 10 and 12, the dynamics of the system are obtained:

$$\begin{bmatrix} y_{k+1} \\ u_{k+1} \end{bmatrix} = \begin{bmatrix} I - H_s & I - H_s \\ KH_s & KH_s \end{bmatrix} \begin{bmatrix} y_k \\ u_k \end{bmatrix} + \begin{bmatrix} -\Gamma_s x_k(0) \\ K\Gamma_s x_k(0) \end{bmatrix} \quad (14)$$

For stability and no radial error propagation, the matrix K must be chosen such that the matrix $$\begin{bmatrix} I - H_s & I - H_s \\ KH_s & KH_s \end{bmatrix} \quad (15)$$

is stable. This is necessary and sufficient to prevent the radial error propagation. Such a matrix K that renders Equation 15 stable will be referred to herein as a stabilizing matrix.

It was assumed above that the subsequent track was written on the very first revolution of following on the prior track. Usually, the transients from a seek to the prior track need to decay before the start of servowriting the next track in order to obtain a good quality of written track. Assume that the track (k+1) is written on the second disk revolution of track following on track k. Then redefining $$y_k = \begin{bmatrix} y_k(N) \\ y_k(N+1) \\ M \\ y_k(2N-1) \end{bmatrix}; e_k = \begin{bmatrix} e_k(N) \\ e_k(N+1) \\ M \\ e_k(2N-1) \end{bmatrix}; u_k = \begin{bmatrix} u_k(N) \\ u_k(N+1) \\ M \\ u_k(2N-1) \end{bmatrix} \quad (16)$$

the dynamic model is given by $$\begin{bmatrix} y_{k+1} \\ u_{k+1} \end{bmatrix} = \begin{bmatrix} I - H_s & I - H_s \\ KH_s & KH_s \end{bmatrix} \begin{bmatrix} y_k \\ u_k \end{bmatrix} + \begin{bmatrix} -\Gamma_s x_k(N) \\ K\Gamma_s x_k(N) \end{bmatrix} \quad (17)$$

where $x_k(N)$ is the state on the Nth sample. However, since $y_k$ and $u_k$ are both repetitive signals, the values of $y_k$ and $u_k$ in Equations 6 are the same as in Equations 16, i.e., $$\begin{bmatrix} y_k(0) \\ y_k(1) \\ M \\ y_k(N-1) \end{bmatrix} = \begin{bmatrix} y_k(N) \\ y_k(N+1) \\ M \\ y_k(2N-1) \end{bmatrix}; \begin{bmatrix} u_k(0) \\ u_k(1) \\ M \\ u_k(N-1) \end{bmatrix} = \begin{bmatrix} u_k(N) \\ u_k(N+1) \\ M \\ u_k(2N-1) \end{bmatrix} \quad (18)$$

However, $e_k$ in Equations 16 is NOT the same as in Equations 6. The value of the state of the sensitivity function S on the Nth sample of track following is related to the initial condition as follows:

$$x_k(N) = A^N x_k(0) + \lambda(y_k + u_k) \quad (19)$$

where $$\lambda = [B \; AB \; L \; AN^{-1}B] \quad (20)$$

Substituting in Equation 14 and simplifying, the modified dynamics are as follows:

$$\begin{bmatrix} y_{k+1} \\ u_{k+1} \end{bmatrix} = \begin{bmatrix} I - H_s - \Gamma_s\lambda & I - H_s - \Gamma_s\lambda \\ KH_s + K\Gamma_s\lambda & KH_s + K\Gamma_s\lambda \end{bmatrix} \begin{bmatrix} y_k \\ u_k \end{bmatrix} + \begin{bmatrix} -\Gamma_s x_k(0) \\ K\Gamma_s x_k(0) \end{bmatrix} \quad (21)$$

Thus, for preventing radial error propagation K should be selected such that the matrix $$\overline{A} = \begin{bmatrix} I - H_s - \Gamma_s\lambda & I - H_s - \Gamma_s\lambda \\ KH_s + K\Gamma_s\lambda & KH_s + K\Gamma_s\lambda \end{bmatrix} \quad (22)$$

is stable. For a typical disk drive servo system, it has been found that the following choice of K is able to stabilize the matrix $\overline{A}$ given in Equation 22.

$$K = \begin{bmatrix} \alpha_0 & \alpha_1 & \alpha_2 & \alpha_3 & K & 0 \\ 0 & \alpha_0 & \alpha_1 & \alpha_2 & O & M \\ 0 & 0 & \alpha_0 & \alpha_1 & O & \alpha_3 \\ 0 & 0 & 0 & \alpha_0 & O & \alpha_2 \\ M & M & O & O & O & \alpha_1 \\ \alpha_1 & \alpha_2 & \alpha_3 & K & 0 & \alpha_0 \end{bmatrix} \quad (23)$$

This corresponds to the following choice of the correction signal:

$$u_{k+1}(t) = \alpha_0 e_k(t) + \alpha_1 e_k(t+1) + \alpha_2 e_k(t+2) + \alpha_3 e_k(t+3) \; 0 \leq t \leq (N-1) \quad (24)$$

That is, the correction factor for the subsequent track (k+1) on sector t is given by $\alpha_0$ times the PES on wedge t while the track was written, plus $\alpha_1$ times the PES on wedge (t+1) while the track was written and so on. This correction signal is computationally simple to implement in firmware and does not require special filtering. The indices (t), (t+1), (t+2) and (t+3) in equation 24 are modulo N (i.e., the indices wrap around at t=0 and t=N−1), with N being the number of servo sectors in the drive. For example, if N=180 and t=179, then $e_k(179+1) = e_k(180) = e_k(0)$, etc.

It may be observed that $$\overline{A} = \begin{bmatrix} I - H_s - \Gamma_s\lambda & I - H_s - \Gamma_s\lambda \\ KH_s + K\Gamma_s\lambda & KH_s + K\Gamma_s\lambda \end{bmatrix} \quad (25)$$
$$= \begin{bmatrix} I - H_s - \Gamma_s\lambda & I - H_s - \Gamma_s\lambda \\ 0 & 0 \end{bmatrix} + \begin{bmatrix} 0 \\ I \end{bmatrix} K[H_s + \Gamma_s\lambda \;\; H_s + \Gamma_s\lambda]$$

Hence, the choice of a stabilizing K is equivalent to stabilizing the MIMO system $$X_{k+1} = \begin{bmatrix} I - H_s - \Gamma_s\lambda & I - H_s - \Gamma_s\lambda \\ 0 & 0 \end{bmatrix} X_k + \begin{bmatrix} 0 \\ I \end{bmatrix} \mu_k \quad (26)$$

$\gamma_k = [H_s + \Gamma_s\lambda \; H_s + \Gamma_s\lambda] X_k$ by static output feedback, i.e., $$\mu_k = K\gamma_k \quad (27)$$

Hence, well known control methodologies such as $H_2/H_\infty$ may be applied to find an optimal K (See, e.g., D. Arzelier, D. Peaucelle, "An iterative method for mixed H2/Hinfinitysynthesis via static output-feedback", CDC, Las Vegas, 2002).

A double integrator model of the VCM and actuator system and a $4^{th}$ order track following compensator was used for a simulation of the system. The sampling time was assumed to be 71.8 microseconds. The (A,B,C,D) matrices of the sensitivity function were as follows:

$$A = \begin{bmatrix} 0.9015 & 0.6242 & 0.1954 & -0.9337 & -0.0620 & 0.2627 & -0.0053 \\ 1.0000 & 0 & 0 & 0 & 0 & 0 & 0 \\ 0 & 1.0000 & 0 & 0 & 0 & 0 & 0 \\ 0 & 0 & 1.0000 & 0 & 0 & 0 & 0 \\ 0 & 0 & 0 & 1.0000 & 0 & 0 & 0 \\ 0 & 0 & 0 & 0 & 1.0000 & 0 & 0 \\ 0 & 0 & 0 & 0 & 0 & 1.0000 & 0 \end{bmatrix}; B = \begin{bmatrix} 1 \\ 0 \\ 0 \\ 0 \\ 0 \\ 0 \\ 0 \end{bmatrix} \quad (28)$$

$C = [-0.3283 \; -0.2986 \; 0.8035 \; 0.1024 \; -0.1156 \; -0.1753 \; -0.0053]$ $D = 1$

The subsequent track was assumed to be written on the second revolution of following on the prior track. The TMR sources for the simulation comprised windage and bias disturbances, disk flutter and spindle nonrepeatable runout (NRRO) and sensor noise (assumed white). The K matrix was chosen as follows:

$$K = \begin{bmatrix} \alpha_0 & \alpha_1 & \alpha_2 & \alpha_3 & K & 0 \\ 0 & \alpha_0 & \alpha_1 & \alpha_2 & O & M \\ 0 & 0 & \alpha_0 & \alpha_1 & O & \alpha_3 \\ 0 & 0 & 0 & \alpha_0 & O & \alpha_2 \\ M & M & O & O & O & \alpha_1 \\ \alpha_1 & \alpha_2 & \alpha_3 & K & 0 & \alpha_0 \end{bmatrix} \quad (29)$$

with $\alpha_0 = 0.65, \alpha_1 = 0.25, \alpha_2 = 0.25, \alpha_3 = 0.25$. Note that this corresponds to the following choice of the correction law:

$$u_k(t) = \alpha_0 e_{k-1}(t) + \alpha_1 e_{k-1}(t+1) + \alpha_2 e_{k-1}(t+2) + \alpha_3 e_{k-1}(t+3) \quad (30)$$

Figure 5:
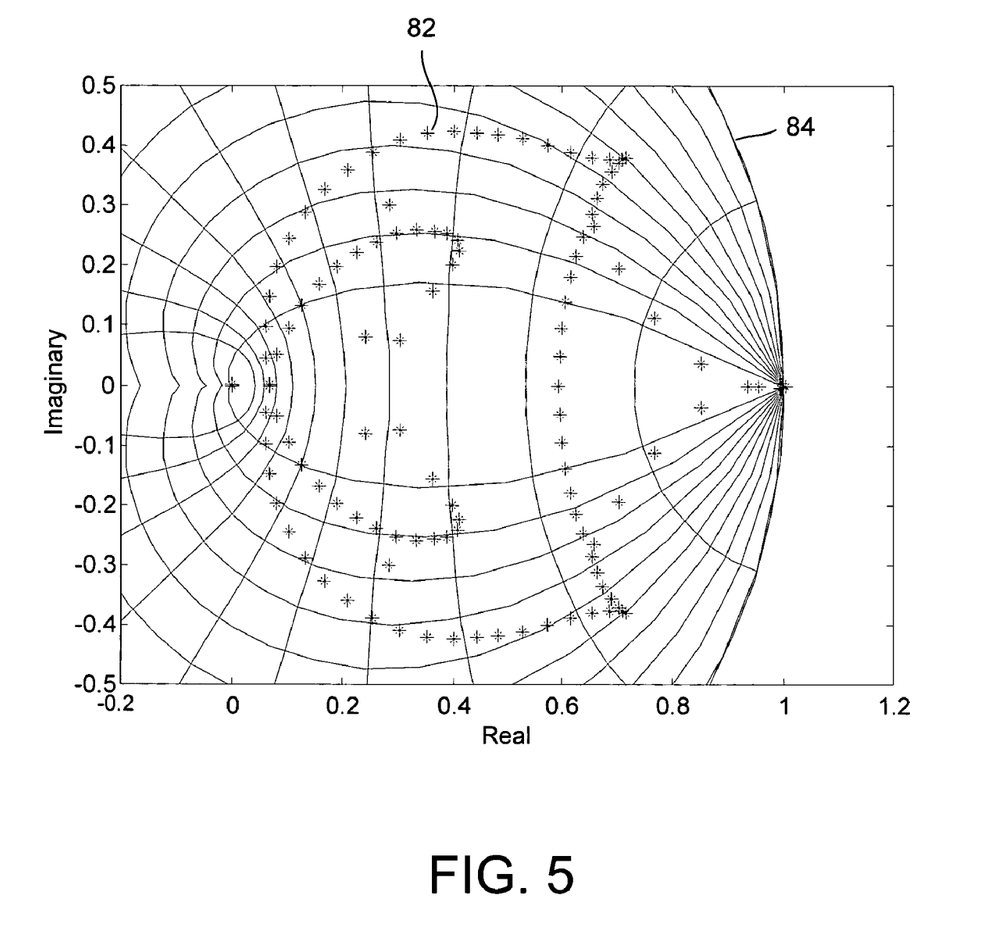
FIG. 5 is a graph of the eigenvalues of a matrix $\overline{A}$ that verifies the stability of the servo control loop of FIGS. 3 and 4 for selected learning gain coefficients of a stabilizing square matrix.

The eigenvalues 82 of the matrix $\overline{A}$ in Equation 22 with the aforementioned choice of the K matrix are shown in FIG. 5. All eigenvalues are inside the unit circle 84 as required for stability. The placement of the eigenvalues may be altered by choice of these coefficients or adding more diagonal elements to the K matrix in Equation 29.

Figure 6:
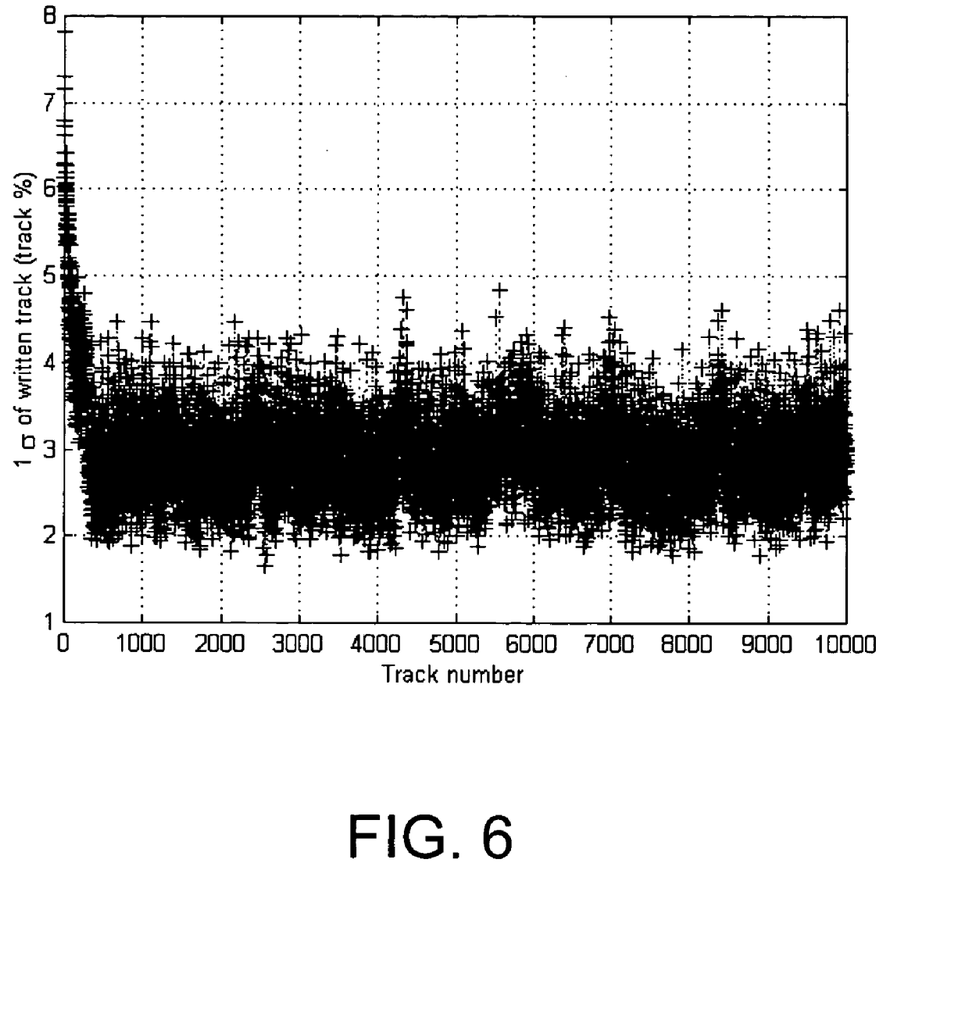
FIG. 6 is a graph showing an absence of radial error propagation for tracks written using the self-servowriting techniques of the present invention.
Figure 7:
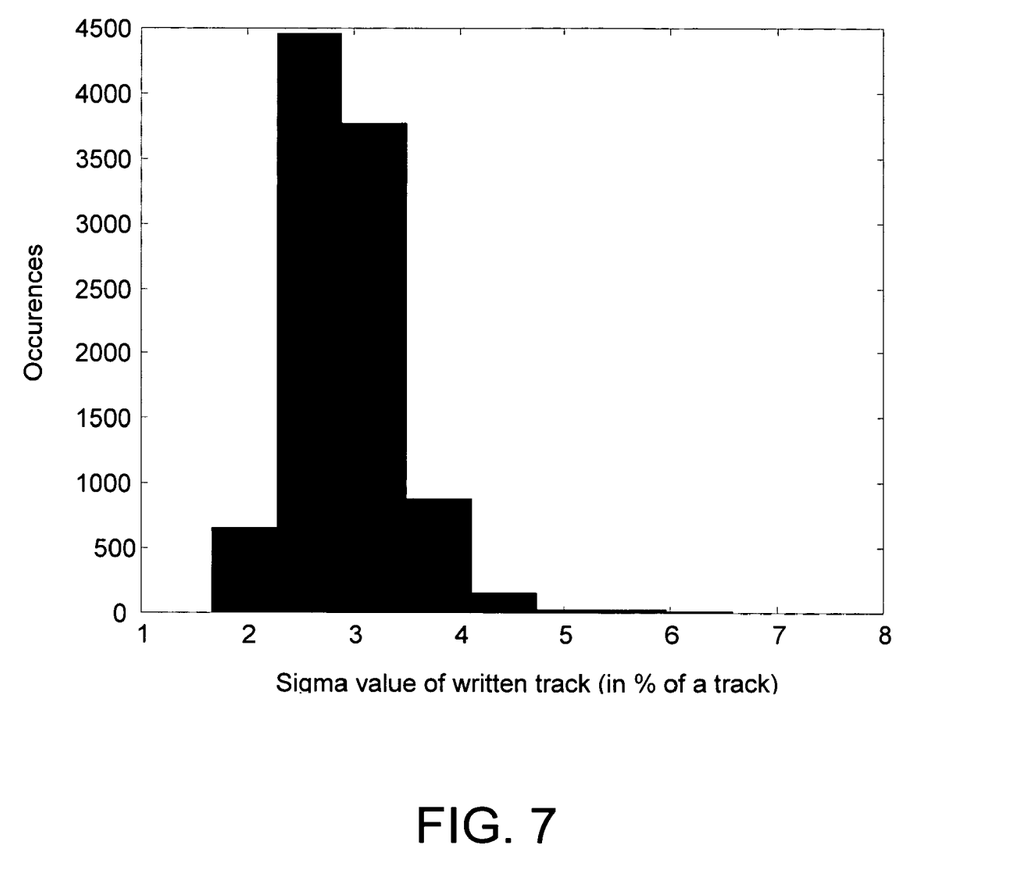
FIG. 7 is a histogram of track spacing for tracks written using the self-servowriting techniques of the present invention.
Figure 8:
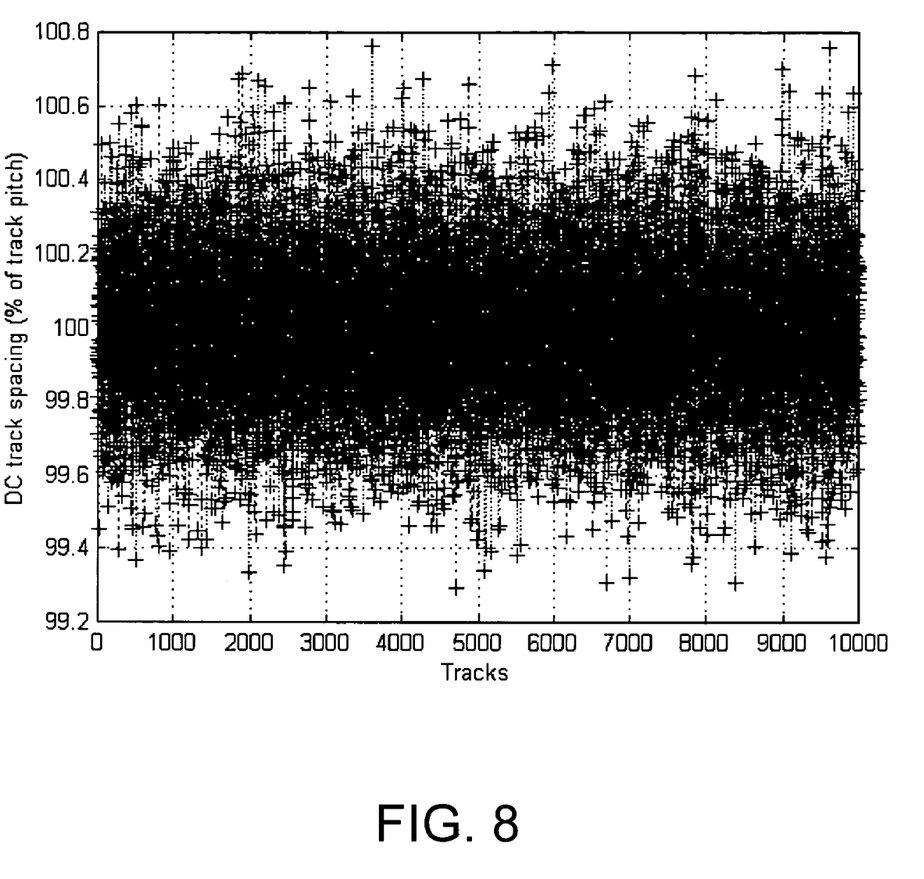
FIG. 8 is a graph showing mean values of DC track spacing for tracks written using the self-servowriting techniques of the present invention.
Figure 9:
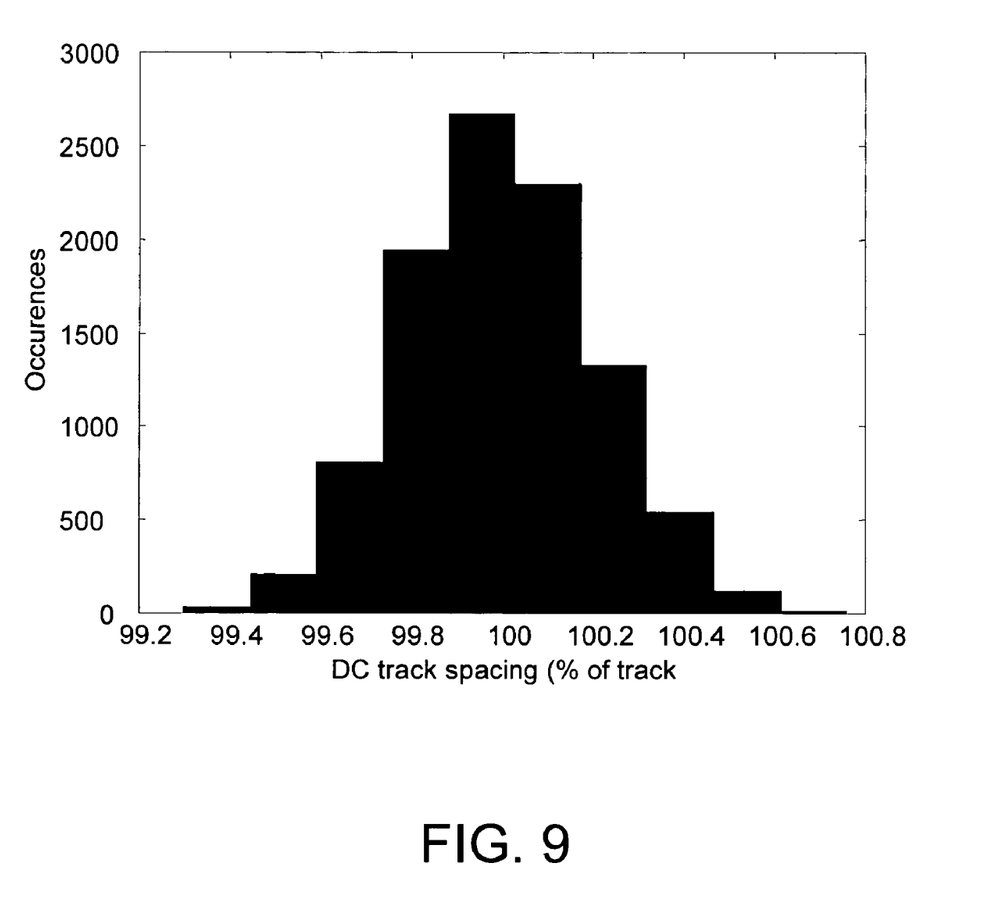
FIG. 9 is a histogram of mean values of DC track spacing for tracks written using the self-servowriting techniques of the present invention.
Figure 10:
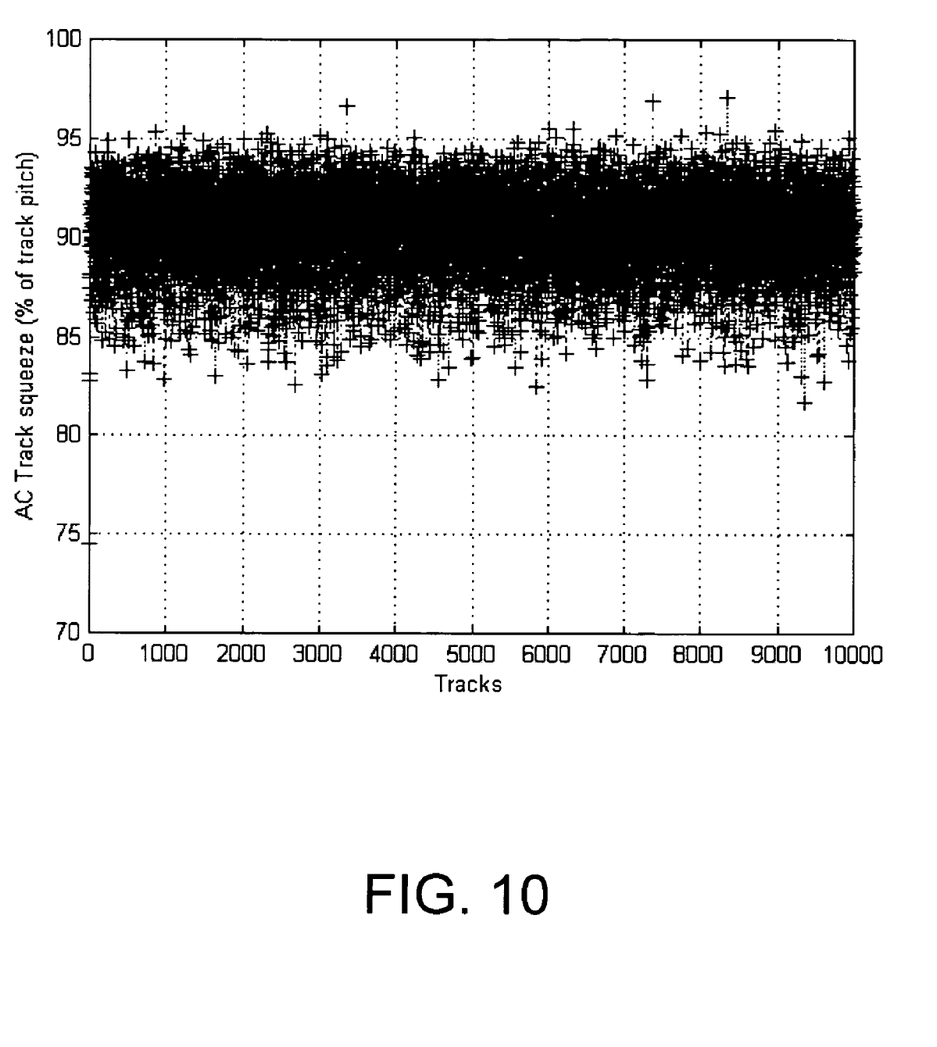
FIG. 10 is a graph showing AC track squeeze for tracks written using the self-servowriting techniques of the present invention.
Figure 11:
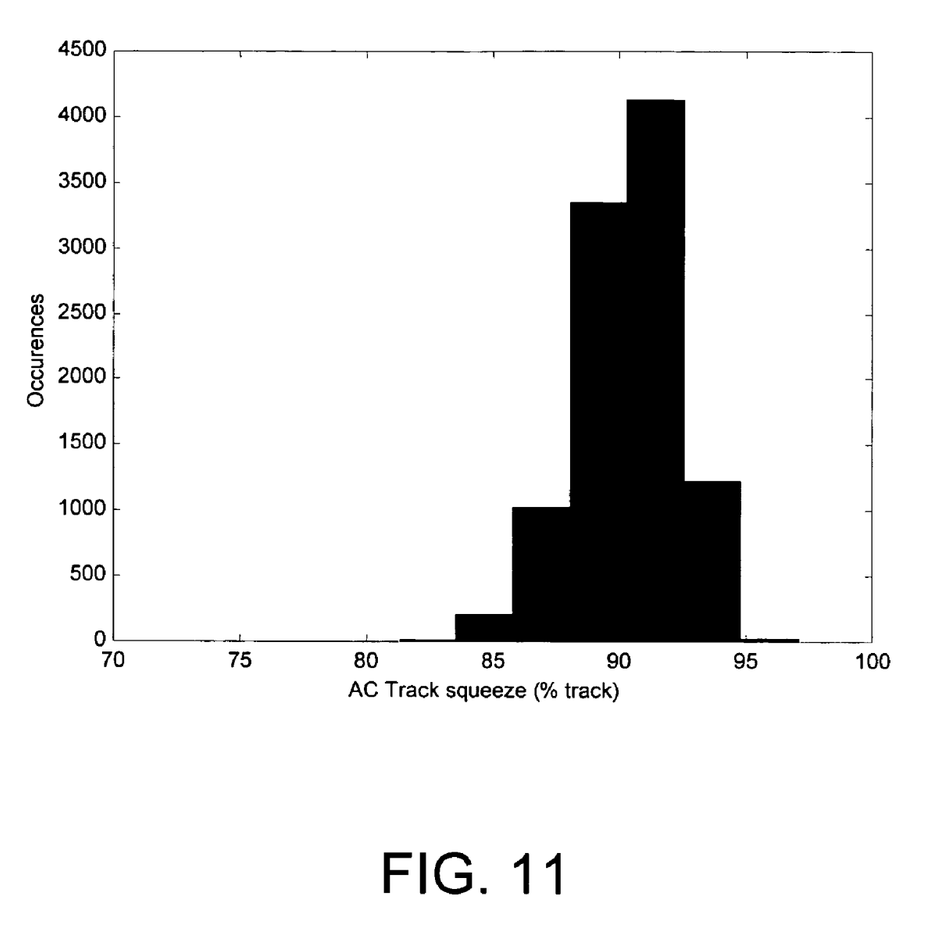
FIG. 11 is a histogram of AC track squeeze for tracks written using the self-servowriting techniques of the present invention.

The graph of a sigma value of the written tracks, expressed in % of a track, and a related histogram, are shown in FIGS. 6 and 7, respectively. It may be seen that radial error propagation is absent and the sigma value of the written track is kept within acceptable limits (<5%). The DC track spacing (mean value) is plotted in FIG. 8, and in a related histogram in FIG. 9, which show prevention of radial error propagation. AC track squeeze, defined as the minimum distance between two adjacent tracks, is plotted in FIG. 10 and in a related histogram in FIG. 11.

What is claimed is:

1. A method for preventing radial error propagation during self-servowriting of concentric tracks on a magnetic disk in a disk drive, wherein each written track comprises a plurality of embedded servo sectors that define a circumferential path and that eventually form corresponding servo wedges extending radially across the magnetic disk such that each servo sector t of a track corresponds to a particular servo wedge, the method comprising:

track following along a previously written track k and determining a position error signal e for each servo sector t;

recursively estimating a correction value u for each servo sector t of an adjacent track k+1 based on the equation:

$u_{k+1}(t) = \alpha_0 e_k(t) + \alpha_1 e_k(t+1) + \alpha_2 e_k(t+2) + \alpha_3 e_k(t+3)$ where k is the track number, t is the sector number for a sector corresponding to a particular wedge, and $\alpha_0, \alpha_1, \alpha_2$, and $\alpha_3$ are learning gain coefficients; and wherein the correction value $u_{k+1}(t)$ is for use in correcting a position error signal $e_{k+1}(t)$ determined using the corresponding servo sector t of the adjacent track k+1 to prevent radial error propagation from track k to track k+1.

2. A method for preventing radial error propagation during self-servowriting of concentric tracks as defined in claim 1, wherein $\alpha_0$ is equal to about 0.65, $\alpha_1$ is equal to about 0.25, $\alpha_2$ is equal to about 0.25, and $\alpha_3$ is equal to about 0.25.

3. A method for preventing radial error propagation during self-servowriting of concentric tracks on a magnetic disk in a disk drive, wherein each written track comprises a plurality of embedded servo sectors that define a circumferential path and that eventually form corresponding servo wedges extending radially across the magnetic disk such that each servo sector t of a track corresponds to a particular servo wedge, the method comprising:

track following along a previously written track k and determining a position error signal e for each servo sector t;

recursively estimating a correction value u for each servo sector t of an adjacent track k+1 based on the equation:

$$u_{k+1} = Ke_k$$

where
- $u_{k+1}$ is a vector of dimension N,
- N is the total number of servo sectors per track;
- k is the track number, and
- K is a stabilizing square matrix of learning coefficients having dimensions N×N; and wherein the correction value $u_{k+1}$ is for use in correcting a position error signal $e_{k+1}$ determined using the corresponding servo sector t of the adjacent track k+1 to prevent radial error propagation from track k to track k+1.

4. A method for preventing radial error propagation during self-servowriting of concentric tracks as defined in claim 3, wherein the stabilizing square matrix K is defined as follows:

$$K = \begin{bmatrix} \alpha_0 & \alpha_1 & \alpha_2 & \alpha_3 & 0 & L & 0 \\ 0 & \alpha_0 & \alpha_1 & \alpha_2 & \alpha_3 & O & M \\ 0 & 0 & \alpha_0 & \alpha_1 & \alpha_2 & O & 0 \\ 0 & 0 & 0 & \alpha_0 & \alpha_1 & O & \alpha_3 \\ M & O & O & O & O & O & \alpha_2 \\ 0 & 0 & 0 & 0 & 0 & O & \alpha_1 \\ \alpha_1 & \alpha_2 & \alpha_3 & 0 & L & 0 & \alpha_0 \end{bmatrix}$$

where $\alpha_0$, $\alpha_1$, $\alpha_2$, and $\alpha_3$ are learning gain coefficients.

5. A method for preventing radial error propagation during self-servowriting of concentric tracks as defined in claim 4, wherein $\alpha_0$ is equal to about 0.65, $\alpha_1$ is equal to about 0.25, $\alpha_2$ is equal to about 0.25, and $\alpha_3$ is equal to about 0.25.

* * * * *